US011132701B2

(12) United States Patent
Tremblay

(10) Patent No.: US 11,132,701 B2
(45) Date of Patent: Sep. 28, 2021

(54) METHOD AND USER DEVICE FOR GENERATING PREDICTED SURVEY PARTICIPATION DATA AT THE USER DEVICE

(71) Applicant: ASTUTE INC, Columbus, OH (US)

(72) Inventor: Marc Tremblay, Montreal (CA)

(73) Assignee: EMPLIFI INC., Columbus, OH (US)

( * ) Notice: Subject to any disclaimer, the term of this patent is extended or adjusted under 35 U.S.C. 154(b) by 1149 days.

(21) Appl. No.: 15/379,823

(22) Filed: Dec. 15, 2016

(65) Prior Publication Data

US 2018/0174167 A1 Jun. 21, 2018

(51) Int. Cl.
  *G06Q 30/02* (2012.01)
  *G06N 5/04* (2006.01)
  *G06N 20/00* (2019.01)

(52) U.S. Cl.
  CPC .......... *G06Q 30/0203* (2013.01); *G06N 5/04* (2013.01); *G06N 20/00* (2019.01); *G06Q 30/0202* (2013.01)

(58) Field of Classification Search
  CPC ....... G06Q 30/0202; G06N 20/00; G06N 5/04
  USPC ...................................................... 705/7.31
  See application file for complete search history.

(56) References Cited

U.S. PATENT DOCUMENTS

| | | | |
|---|---|---|---|
| 5,444,819 A * | 8/1995 | Negishi | G06N 3/049 706/21 |
| 6,917,952 B1 * | 7/2005 | Dailey | G06F 40/35 |
| 8,396,737 B2 | 3/2013 | Lakshminarayan et al. | |
| 2002/0091875 A1 * | 7/2002 | Fujiwara | G06Q 30/0251 719/330 |
| 2007/0011039 A1 | 1/2007 | Oddo | |
| 2014/0086495 A1 * | 3/2014 | Hao | G06K 9/00664 382/218 |
| 2014/0143017 A1 * | 5/2014 | Kannan | G06Q 30/0203 705/7.32 |

(Continued)

OTHER PUBLICATIONS

Predicting potential respondents' decision to participate in web surveys Fang, Jiaming; Wen, Chao. International Journal of Services Technology and Management 18.1-2: 16. Inderscience Enterprises Ltd. (2012) (Abstract).*

(Continued)

*Primary Examiner* — Timothy Padot
(74) *Attorney, Agent, or Firm* — Dickinson Wright PLLC

(57) ABSTRACT

A method for generating predicted survey participation data at a current user device. A server collects training behavioral data related to a website from a plurality of user devices. The server also collects training survey participation data related to the website from at least some of the plurality of user devices. The server analyzes the training survey participation data and the corresponding training behavioral data to infer correlations between the training survey participation data and the corresponding training behavioral data. The server further generates predictive survey participation patterns based on the inferred correlations. The server transmits the predictive survey participation patterns to the current user device. The current device collects current behavioral data related to the website. Then, the current user device determines predicted survey participation data for the current user device in relation to the website based on the current behavioral data and the predictive survey participation patterns.

5 Claims, 5 Drawing Sheets

(56) References Cited

U.S. PATENT DOCUMENTS

| | | | | |
|---|---|---|---|---|
| 2015/0332156 | A1* | 11/2015 | Pliner | G06Q 30/02 |
| | | | | 706/52 |
| 2015/0348071 | A1* | 12/2015 | Cochrane | G06F 16/958 |
| | | | | 705/7.32 |
| 2016/0225021 | A1* | 8/2016 | Cochrane | G06Q 30/0255 |
| 2017/0017991 | A1* | 1/2017 | Cochrane | G06Q 30/0277 |

OTHER PUBLICATIONS

Business Intelligence and CRM Industry Leaders Support the Latest Release of Sane Solutions' NetTracker(R) Web Analytics Software. Business/Technology Editors. Business Wire [New York] Oct. 1, 2001: 1.*

WebCriteria Launches Research Study to Discover Insights in Browsing Behavior on the Web. PR Newswire [New York] Mar. 27, 2000: 1.*

Using Web Analytics to Increase Conversions: 6. Additional Metrics for Increasing Sales & Generating Leads Anonymous. Direct Marketing Association (DMA). Web Analytics Report. (Nov. 2007).*

* cited by examiner

METHOD AND USER DEVICE FOR GENERATING PREDICTED SURVEY PARTICIPATION DATA AT THE USER DEVICE

TECHNICAL FIELD

The present disclosure relates to the field of website analytics via web surveys. More specifically, the present disclosure relates to a method, computer program product and user device for generating predicted survey participation data at the user device.

BACKGROUND

The usage of websites to make dedicated web content available to a large public is now prevalent, in relation with the widespread usage of fixed Internet access and mobile Internet access. In particular, e-commerce has become a major component of the economy, in a plurality of business areas such as for example travel agencies, on-line banking, consumer electronics and multimedia retail sales, etc. Websites in relation to professional services and administration are now also widely used to reach prospects and users.

There is a growing need for the owner or administrator of a website to better understand whether the visitors are satisfied with their interactions with the website, what is the purpose of the visitors when visiting the website, etc.; in order to better satisfy the needs of the visitors, to rapidly detect and identify operational issues affecting the user experience of the visitors, etc. One way to obtain such information is to invite some of the visitors to participate to a web survey during or after the browsing of the website. By gathering answers to the web survey over a panel of visitors, the user experience with respect to the visit of the website can be evaluated. Similarly, the intent of the visitors for visiting the website can be determined via the web survey.

Survey participation data are usually only available for a fraction of the visitors who visited the website (the visitors who were invited to participate to the survey, and who further accepted to participate to the survey). For the visitors for whom survey participation data are not available, it would be beneficial to generate predicted survey participation data based on other available data. For example, behavioral data can also be collected with respect to the visited website, and correlated to the survey participation data when those are available. Thus, when no survey participation data are available, they can be predicted based on the available behavioral data and the generated correlations. The determination of the correlations between the collected survey participation data and the collected behavioral data is performed by a centralized server. The centralized server collects the data used for determining the correlations from a plurality of user devices, during a visit of the website by the users of the plurality of user devices. The generation of the predicted survey participation (when no survey participation data are collected from a particular user device) is also performed by the centralized server.

However, since the predicted survey participation data are generally ultimately used at the user device (for instance as an input for selecting advertisements displayed to the user of the user device), a plurality of exchanges occurs between the user device and the centralized server. These exchanges include the transmission of collected current behavioral data from the user device and the centralized server, and the transmission in return of predicted survey participation data (determined based on the collected current behavioral data) from the centralized server to the user device. Thus, it may be advantageous in certain circumstances to have the predicted survey participation data determined directly by the user device, and thus avoiding reliance on the centralized server for this task. This approach is consistent with a tendency consisting in deporting more intelligence in the user device, and thus gaining more autonomy with respect to centralized servers.

There is therefore a need for a method, computer program product and user device for generating predicted survey participation data at the user device.

SUMMARY

According to a first aspect, the present disclosure provides a method for generating predicted survey participation data at a current user device. The method comprises collecting by a processing unit of a server training behavioral data from a plurality of user devices. The training behavioral data are representative of a series of actions performed by a user of each of the plurality of user devices while visiting a specific website. The method comprises collecting by the processing unit of the server training survey participation data from at least some of the plurality of user devices. The training survey participation data correspond to survey information received from the users of the at least some of the plurality of user devices when participating to a web survey related to the visit of the specific website. The method comprises analyzing by the processing unit of the server the training survey participation data and the corresponding training behavioral data to infer correlations between the training survey participation data and the corresponding training behavioral data. The method comprises generating by the processing unit of the server predictive survey participation patterns based on the inferred correlations. The method comprises transmitting the predictive survey participation patterns from the server to the current user device, and storing the predictive survey participation patterns at a memory of the current user device. The method comprises collecting by a processing unit of the current user device current behavioral data. The current behavioral data are representative of a series of actions performed by a user of the current user device while visiting the specific website. The method comprises determining by the processing unit of the current user device predicted survey participation data for the current user device in relation to the specific website based on the current behavioral data and the predictive survey participation patterns.

According to a second aspect, the present disclosure provides a non-transitory computer program product comprising instructions thereon. The instructions, when executed by a processing unit of a user device, implement the aforementioned method for generating predicted survey participation data at the user device.

According to a third aspect, the present disclosure provides a user device for generating predicted survey participation data at the user device. The user device comprises a communication interface for receiving predictive survey participation patterns from a server. The predictive survey participation patterns are representative of correlations inferred by the server between training survey participation data related to a specific website and corresponding training behavioral data related to the specific website. The user device comprises a memory for storing the predictive survey participation patterns. The user device comprises a processing unit for collecting current behavioral data. The current behavioral data are representative of a series of actions performed by a user of the user device while visiting the specific website. The processing unit further determines predicted survey participation data for the user device in relation to the specific website based on the current behavioral data and the predictive survey participation patterns.

BRIEF DESCRIPTION OF THE DRAWINGS

Embodiments of the disclosure will be described by way of example only with reference to the accompanying drawings, in which.

DETAILED DESCRIPTION

Figure 1:
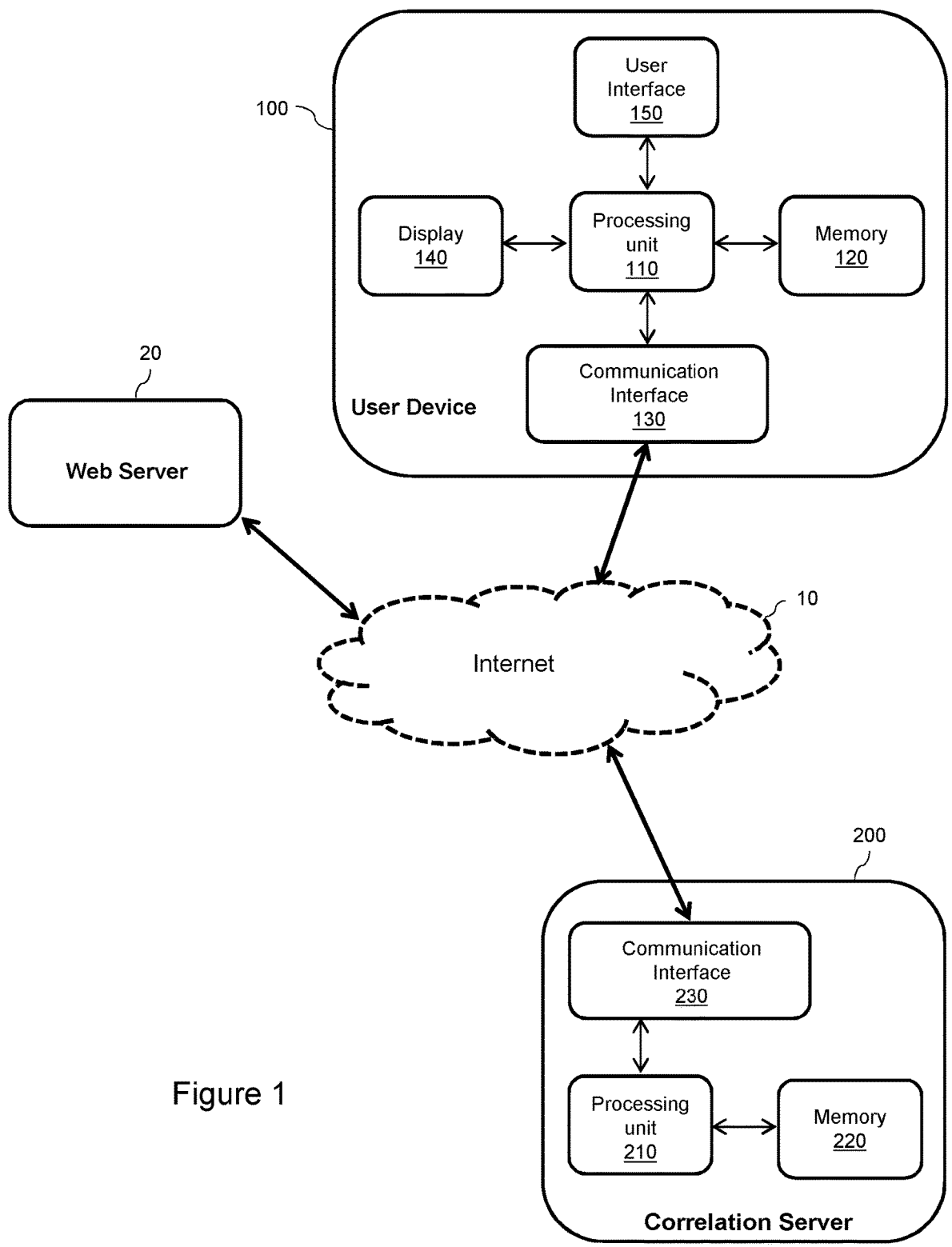
FIG. 1 illustrates a system comprising a user device and a correlation server for generating predicted survey participation data at the user device.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the generation directly at a user device of predicted survey participation data in relation to a visit of a specific website, when no survey participation data in relation to the visit of the specific website are collected at the user device.

The following terminology is used throughout the present disclosure:

Web survey: A web survey aims at collecting user feedback related to a visit of a website by a user. The term survey is used in a generic manner, and may include surveys, questionnaires, comment cards, etc.

Behavioral data: Data representative of a series of actions performed by a user of a user device while visiting a website, a series of events occurring while visiting the website, etc. Behavioral data include visited web pages, time spent on the visited web pages, specific interactions with the visited web pages, etc. The behavioral data are collected by the user device and transmitted to an analytic server. Alternatively, the behavioral data are directly collected by an analytic server collocated with a web server hosting the website. The analytic server processes the data collected from a plurality of user devices whose users have visited the website.

Referring now concurrently to FIGS. 1, 2A, 2B, and 3, a system and a method 300 for generating predicted survey participation data at a user device 100 is represented. The system comprises a correlation server 200 and the user device 100. At least some of the steps of the method 300 are performed by the correlation server 200 and the user device 100.

The correlation server 200 comprises a processing unit 210, having one or more processors (not represented in FIG. 1 for simplification purposes) capable of executing instructions of computer program(s) (e.g. a correlation algorithm). Each processor may further have one or several cores.

The correlation server 200 also comprises memory 220 for storing instructions of the computer program(s) executed by the processing unit 210, data generated by the execution of the computer program(s), data received via a communication interface 230 of the correlation server 200, etc. The correlation server 200 may comprise several types of memories, including volatile memory, non-volatile memory, etc.

The correlation server 200 further comprises the communication interface 230 (e.g. a Wi-Fi interface, an Ethernet interface, a cellular interface, a combination thereof, etc.). The communication interface 230 is used for exchanging data with other entities, such as the user device 100.

The correlation server 200 exchanges data with the other entities through communication links, generally referred to as the Internet 10 for simplification purposes. Such communication links may include wired communication links (e.g. a fixed broadband network) and wireless communication links (e.g. a cellular network or a Wi-Fi network).

Optionally, the correlation server 200 further comprises a display (e.g. a regular screen or a tactile screen) for displaying data generated by the processing unit 210, and a user interface (e.g. a mouse, a keyboard, a trackpad, a touchscreen, etc.) for allowing a user to interact with the correlation server 200. The display and the user interface are not represented in FIG. 1 for simplification purposes.

The correlation server 200 may be implemented by a standard desktop or laptop computer, but is generally implemented by a dedicated computing device having superior computing capabilities and performances.

The user device 100 comprises a processing unit 110, having one or more processors (not represented in FIG. 1 for simplification purposes) capable of executing instructions of computer program(s) (e.g. a web browser). Each processor may further have one or several cores.

The user device 100 also comprises memory 120 for storing instructions of the computer program(s) executed by the processing unit 110, data generated by the execution of the computer program(s), data received via a communication interface 130 of the user device 100, etc. The user device 100 may comprise several types of memories, including volatile memory, non-volatile memory, etc.

The user device 100 further comprises the communication interface 130 (e.g. a cellular interface, a Wi-Fi interface, an Ethernet interface, a combination thereof, etc.). The communication interface 130 is used for exchanging data over the Internet 10 with other entities, such as the web server 20 and the correlation server 200.

The user device 100 further comprises a display 140 (e.g. a regular screen or a tactile screen) for displaying data generated by the processing unit 210, web content retrieved from the web server 20, etc. The user device 100 also comprises a user interface 150 (e.g. a mouse, a keyboard, a trackpad, a touchscreen, etc.) for allowing a user to interact with the user device 100 (e.g. interactions of the user with the displayed web content).

The user device 100 may consist of a desktop or laptop computer, a mobile device (e.g. smartphone, tablet, etc.), an Internet connected television, etc. The user device 100 is capable of retrieving web content from the web server 20 over the Internet 10, and displaying the retrieved web content to a user of the user device 100 via a web browser.

Although a single user device 100 is represented in FIG. 1, a plurality of user devices 100 exchange data with the web server 20 in relation to a visit of a specific website (hosted by the web server 20) by the plurality of user devices 100.

The web server 20 generally consists of a dedicated computer with high processing capabilities, capable of hosting one or a plurality of websites. The web server 20 comprises a processing unit, memory, and a communication interface (e.g. Ethernet interface, Wi-Fi interface, etc.) for delivering web content of a hosted website to the user device 100. The components of the web server 20 are not represented in FIG. 1 for simplification purposes.

Figure 2A:
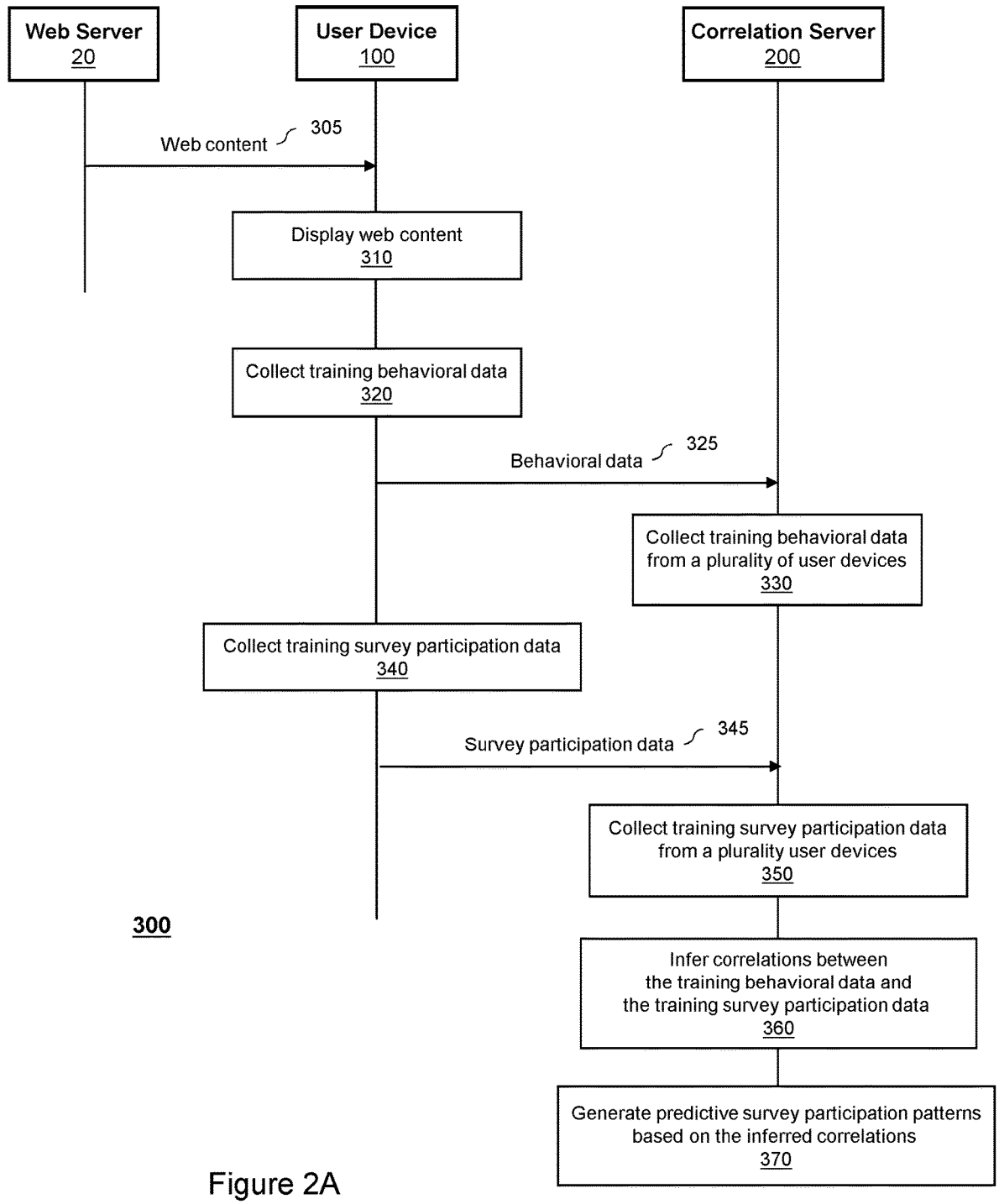
FIGS. 2A and 2B illustrates a method for generating predicted survey participation data at the user device represented in FIG. 1.
Figure 2B:
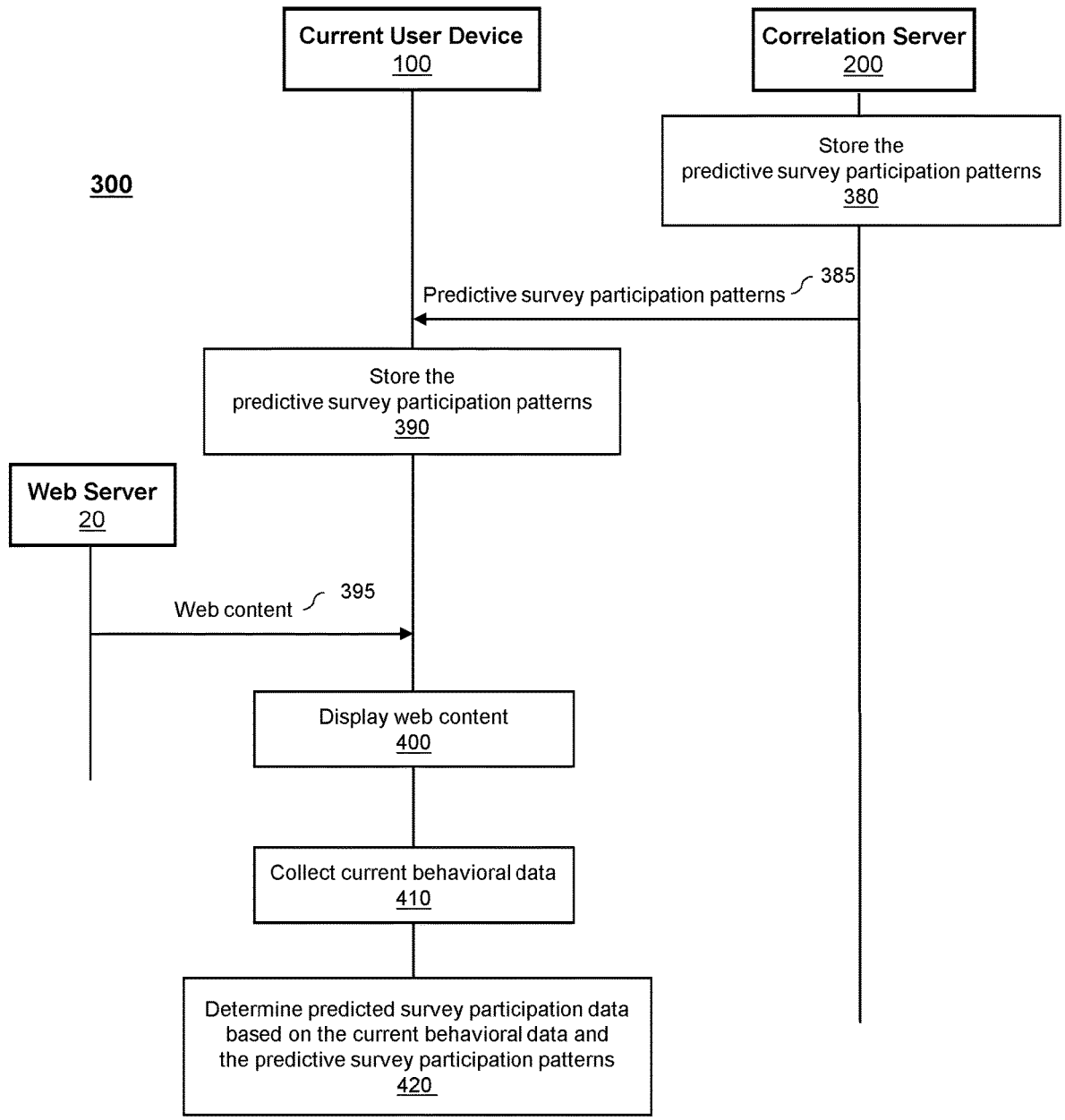

Referring now particularly to FIGS. 2A and 2B, the steps of the method 300 will be described. The method 300 comprises two phases: a learning phase for generating predictive survey participation patterns at the correlation server 200, and an operational phase for using the generated predictive survey participation patterns to generate predicted survey participation data at the user device 100.

Learning Phase (FIG. 2A)

At step 305, web content corresponding to a specific website is transmitted by the web server 20 to the user device 100 over the Internet 10. The specific website is hosted by the web server 20 and visited by a user of the user device 100. The interactions between the user device 100 and the web server 20 for exchanging the web content are well known in the art. The web content is sent via the communication interface (not represented in FIG. 1) of the web server 20 and received via the communication interface 130 of the user device 100. The web content may include text, image(s), video(s), icon(s), etc.

At step 310, the web content is displayed on the display 140 of the user device 100 by the browser executed by the processing unit 110 of the user device 100. During a browsing session of the specific website, a sequence of web pages of the specific website containing the web content is displayed on the display 140. The user of the user device 100 interacts with the web content of the web pages through the user interface 150 of the user device 100. The user interactions may lead to additional web content being transmitted by the web server 20 to the user device 100. Thus, although a single step 305 and a single step 310 are represented in FIG. 2A for simplification purposes, the sequence of steps 305 and 310 is usually repeated according to a progression of the browsing session of the specific website performed by the user of the user device 100. Furthermore, although a single user device 100 is represented in FIG. 2A, a plurality of user devices 100 are engaged (either simultaneously or sequentially over a given period of time) in a browsing session of the specific website hosted by the web server 20.

At steps 320 and 325, training behavioral data are respectively collected by the processing unit 110 of the user device 100, and transmitted by the processing unit 110 from the user device 100 to the correlation server 200. The training behavioral data are representative of a series of actions performed by the user of the user device 100 while visiting the specific website. The training behavioral data may also be representative of events (directly or indirectly related to the user actions) occurring while visiting the specific website. The training behavioral data are sent via the communication interface 130 of the user device 100 and received via the communication interface 230 of the correlation server 200. The type of behavioral data which can be collected is well known in the art of web analytics, and examples of such behavioral data will be provided later in the description. The collection of the behavioral data at the user device 100 may be implemented via various techniques well known in the art. For example, a dedicated cookie can be installed on the user devices 100. While the user of the user device 100 is browsing the specific website, the dedicated cookie is used for collecting and temporarily storing the behavioral data, before their transmission to the correlation server 200.

In an alternative configuration, the web server 20 performs the collection of the training behavioral data, and the transmission of the training behavioral data to the correlation server 200 over the Internet 10. In still another alternative configuration, the training behavioral data are partially collected by the user device 100 and partially collected by the web server 20, before transmission to the correlation server 200. In yet another alternative configuration, at least some of the training behavioral data (collected by the user device 100 or the web server 20) are transmitted to a third party server (e.g. an analytic server not represented in FIGS. 1 and 3), where they are processed for purposes specific to the third party server. The training behavioral data are further transmitted from the third party server to the correlation server 200, where they are processed according to the method 300. These alternative configurations have not been represented in the Figures for simplification purposes.

For simplification purposes, steps 320 and 325 have been represented after step 310 in FIG. 2A. However, steps 320 and 325 may occur at any time during the browsing session of the specific website (e.g. at the beginning of the browsing session, in the middle of the browsing session, at the end of the browsing session, during the whole browsing session, etc.). Furthermore, the collection of the training behavioral data may occur with respect to a particular web page of the specific website being displayed, or with respect to a plurality of web pages being displayed.

Training behavioral data are collected at step 320 from a plurality of user devices 100, during the browsing session of the users of the plurality of user devices 100. The plurality of user devices 100 transmit the collected training behavioral data to the correlation server 200 at step 325.

At step 330, a behavioral functionality 214 (represented in FIG. 3) executed by the processing unit 210 of the correlation server 200 collects the training behavioral data from the plurality of user devices 100. The training behavioral data are received via the communication interface 230 of the correlation server 200 and stored in the memory 220 for later use. Furthermore, the training behavioral data of a specific user device 100 may be received in several bundles, and aggregated in the memory 220 using the unique identifier of the specific user device 100. As mentioned previously, at least some of the training behavioral data collected by the behavioral functionality 214 may be transmitted by the web server 20 or by an analytic server.

The behavioral functionality 214 executed by the processing unit 210 of the correlation server 200 may also filter the collected training behavioral data, and discard some of them based on pre-determined criteria. The criteria may include at least one of the following: incomplete data, erroneous data, irrelevant data, etc.

The user of the user device 100 also participates to a web survey related to the visit of the specific website, and provides survey information by participating to the web survey. Usually, only a subset of all the user devices 100 engaged in a browsing session of the specific website participate to the web survey. First, only some of the users of the user devices 100 may be invited by a survey server to participate to the web survey, based on a predefined invitation rate. Then, only some of the invited users of the user devices 100 accept to participate to the web survey and to provide survey information.

Figure 3:
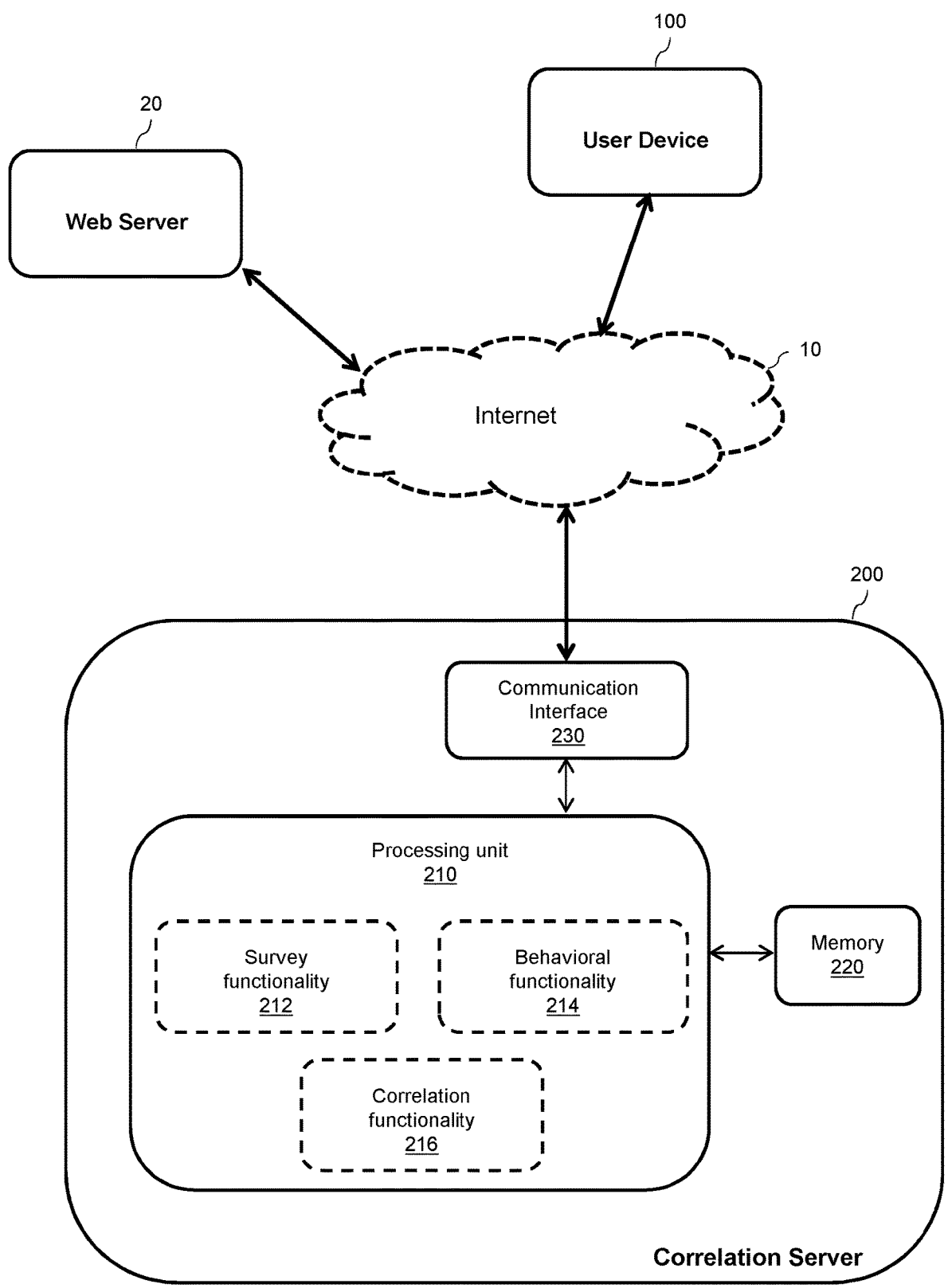
FIG. 3 represents details of the correlation server of FIG. 1.

FIG. 3 illustrates a configuration where the survey server is collocated with the correlation server 200. More specifically, the processing unit 210 of the correlation server 220 executes a survey functionality 212 implementing the functionalities of the survey server.

At steps 340 and 345, training survey participation data are respectively collected by the processing unit 110 of the user device 100, and transmitted by the processing unit 110 from the user device 100 to the correlation server 200. The training survey participation data correspond to the survey information provided by the user of the user device 100. The training survey participation data are sent via the communication interface 130 of the user device 100 and received via the communication interface 230 of the correlation server 200.

For simplification purposes, steps 340 and 345 have been represented after step 310 in FIG. 2A. However, steps 340 and 345 may occur at any time during the browsing session of the specific website (e.g. at the beginning of the browsing session, in the middle of the browsing session, at the end of the browsing session, etc.). The collection of the training survey participation data may occur with respect to a particular web page of the specific website being displayed, or with respect to a plurality of web pages being displayed. Furthermore, although step 340 has been represented after step 320, the collection of the training survey participation data (step 340) at the user device 100 may occur before, during or after the collection of the training behavioral data (step 320) at the user device 100. For instance, the occurrence of a particular event detected during the collection of the training behavioral data triggers the collection of the training survey participation data (if the user of the user device 100 accepts to participate to the web survey).

An example of survey participation data comprises responses to a survey questionnaire related to the visited specific website, and includes at least one of the following: free-form text, ratings, selection of one or more elements among proposed alternatives, ordering of proposed elements, etc. An invitation to participate to the web survey may be prompted to the user of the user device 100 during the visit of the specific website, voluntarily triggered by the user of the user device 100 (e.g. through the selection of a survey icon), communicated to the user of the user device 100 in a delayed manner (e.g. through an email), etc.

Users of a plurality of user devices 100 participate to the web survey related to the specific website, and the plurality of user devices 100 collect corresponding training survey participation data at step 340, and transmit the collected training survey participation data to the correlation server 200 at step 345.

At step 350, the survey functionality 212 executed by the processing unit 210 of the correlation server 200 collects the training survey participation data from the plurality of user devices 100. The training survey participation data are received via the communication interface 230 of the correlation server 200 and stored in the memory 220 for later use. Furthermore, the training survey participation data of a specific user device 100 may be received in several bundles, and aggregated in the memory 220 using a unique identifier of the specific user device 100.

As mentioned previously, training survey participation data are collected at step 330 only from a subset of the user devices 100 from which training behavioral data are collected at step 330. This is due to the fact that not all the users of the user devices 100 accept to participate to the web survey, while the collection of the training behavioral data is generally automatic and is performed without requiring acceptance by the users of the user devices 100.

The survey functionality 212 executed by the processing unit 210 of the correlation server 200 may also filter the collected training survey participation data, and discard some of them based on pre-determined criteria. The criteria may include at least one of the following: incomplete data, erroneous data, irrelevant data, etc.

The survey functionality 212 executed by the processing unit 210 of the correlation server 200 also performs steps (not represented in FIG. 2A for simplification purposes) occurring before step 340: transmission of the invitation to participate to the web survey to the selected user devices 100, sending of the survey questionnaire to the selected user devices 100 having accepted the invitation to participate to the web survey.

In an alternative configuration not represented in the Figures, the survey server is a standalone computing device independent from the correlation server 200. At step 345, the plurality of user devices 100 transmit the training survey participation data to the standalone survey server (instead of directly sending them to the correlation server 200), and the standalone survey server stores the received training survey participation data from the plurality of user devices 100. At step 350, the correlation server 200 collects the training survey participation data corresponding to the plurality of user devices 100 from the survey server (instead of directly collecting them from the plurality of user devices 100).

At step 360, a correlation functionality 216 executed by the processing unit 210 of the correlation server 200 analyzes the training behavioral data collected at step 330 and the training survey participation data collected at step 350 to infer correlations between the training behavioral data and the training survey participation data.

A common unique identifier of the user devices 100 is used by the behavioral functionality 212, the survey functionality 214 and the correlation functionality 216 for identifying each user device 100. Having training survey participation data for a specific user device, the common unique identifier is used for identifying the corresponding training behavioral data for the specific user device. For instance, the unique identifier is an anonymized (for privacy issues) unique identifier, generated based on a user device specific identifier, such as a Media Access Control (MAC) address in the case of a computer, an International Mobile Subscriber Identity (IMSI) or International Mobile Station Equipment Identity (IMEI) in the case of a smartphone, etc. The inference of the correlations performed at step 360 is based on the analysis of a plurality of pairs of training behavioral data for a specific device/corresponding training survey participation data for the specific device, over a plurality of user devices 100 for which training survey participation data have been collected. Step 360 is performed when a sufficient amount of training survey participation data and corresponding training behavioral data have been collected from the user devices 100.

At step 370, the correlation functionality 216 executed by the processing unit 210 of the correlation server 200 generates predictive survey participation patterns based on the correlations inferred at step 360. The predictive survey participation patterns are a set of data which depends on the specific algorithm used at step 360 for generating the correlation. Based on the predictive survey participation patterns, and having only behavioral data collected for the specific website for a particular user device 100, corresponding predicted survey participation data in relation to the specific website can be extrapolated for the particular user device 100. The predicted survey participation data consist of an extrapolation of effective survey participation data which would have been collected if a user of the particular user device 100 had participated in the web survey related to the specific website.

The present method 300 can be applied to a plurality of websites. For each specific website, training behavioral data and training survey participation data are collected at steps 330 and 350 for each specific website. The correlations inferred at step 360 and the predictive survey participation patterns generated at step 370 are specific to each specific website.

Techniques for inferring correlations between two sets of data, and generating predictive patterns based on the correlations, is well known in the art of data analysis. Statistical and/or artificial intelligence (e.g. machine learning) techniques are used for this purpose. For example, a neural network, a k-nearest neighbors (k-NN) algorithm, a Bayes classifier, etc. can be used. Based on the particular technique being used, a particular type of predictive patterns is generated. Examples of predictive patterns include parameters (e.g. weights for a neural network), a model, a decision tree, etc.

In the case of a neural network, during the learning phase, correlations between the training behavioral data and the training survey participation data are inferred by determining the weights of the neural network. The predictive survey participation patterns comprise the determined weights, and may include other parameters of the neural network such as the number of layers, etc.

At step 380 (represented in FIG. 2B), the processing unit 210 of the correlation server 200 stores the generated predictive survey participation patterns in the memory 220, for use in the operational phase.

In a particular aspect, the survey information provided by the user of the user device 100 when participating to the web survey is at least partially related to an intent of the user for visiting the specific website. For instance, the web survey includes one or more questions related to the intent of the user. Thus, the training survey participation data collected at steps 340 and 350 are at least partially related to an intent of the user for visiting the specific website.

Step 350 comprises determining by the survey functionality 212 executed by the processing unit 210 of the correlation server 200 an intent of the users of the user devices 100 in relation to the visit of the specific website, based on the collected training survey participation data.

At step 360, the analysis by the correlation functionality 216 of the training behavioral data collected at step 330 and the training survey participation data collected at step 350 to infer correlations between the training behavioral data and the training survey participation data more specifically comprises analyzing the training behavioral data collected at step 330 and the intent of the users determined at step 350 to infer correlations between the training behavioral data and the determined intent of the users.

At step 370, the generation by the correlation functionality 216 of predictive survey participation patterns based on the correlations inferred at step 360 more specifically comprises generating predictive user intent patterns based on the correlations inferred at step 360. Based on the predictive user intent patterns, and having only behavioral data collected for the specific website for a particular user device 100, a corresponding predicted user intent in relation to the specific website can be extrapolated for the particular user device 100.

Examples of user intent for visiting the specific website include information gathering, price learning, purchase, account management, user support, etc. The user intent being information gathering corresponds to a user visiting the specific website for obtaining general information about a product, a service, etc. presented on the specific website. The user intent being price learning corresponds to a user visiting the specific website for obtaining specific information related to the price of a product, a service, etc. presented on the specific website. The user intent being purchase corresponds to a user visiting the specific website for purchasing a product, a service, etc. available through the specific website. The user intent being account management corresponds to a user visiting the specific website for creating/managing a user account on the specific website. The user intent being support corresponds to a user visiting the specific website for obtaining support via the specific website for a product or service previously purchased by the user.

Other types of user intent may be determined based on the collected training survey participation data, such as for example: a purpose of visit, a purchase horizon, a purchase stage, a channel of choice (e.g. online versus offline), an intent of travel (e.g. business versus leisure), etc. As mentioned previously, the present method 300 can be applied to a variety of websites, and for each specific website, a list of relevant user intents can be determined based on the specificities of the specific website. The list of relevant user intents can be submitted to a visitor of the specific website via a survey, as illustrated in FIG. 4, to collect survey participation data comprising the user intent.

Figure 4:
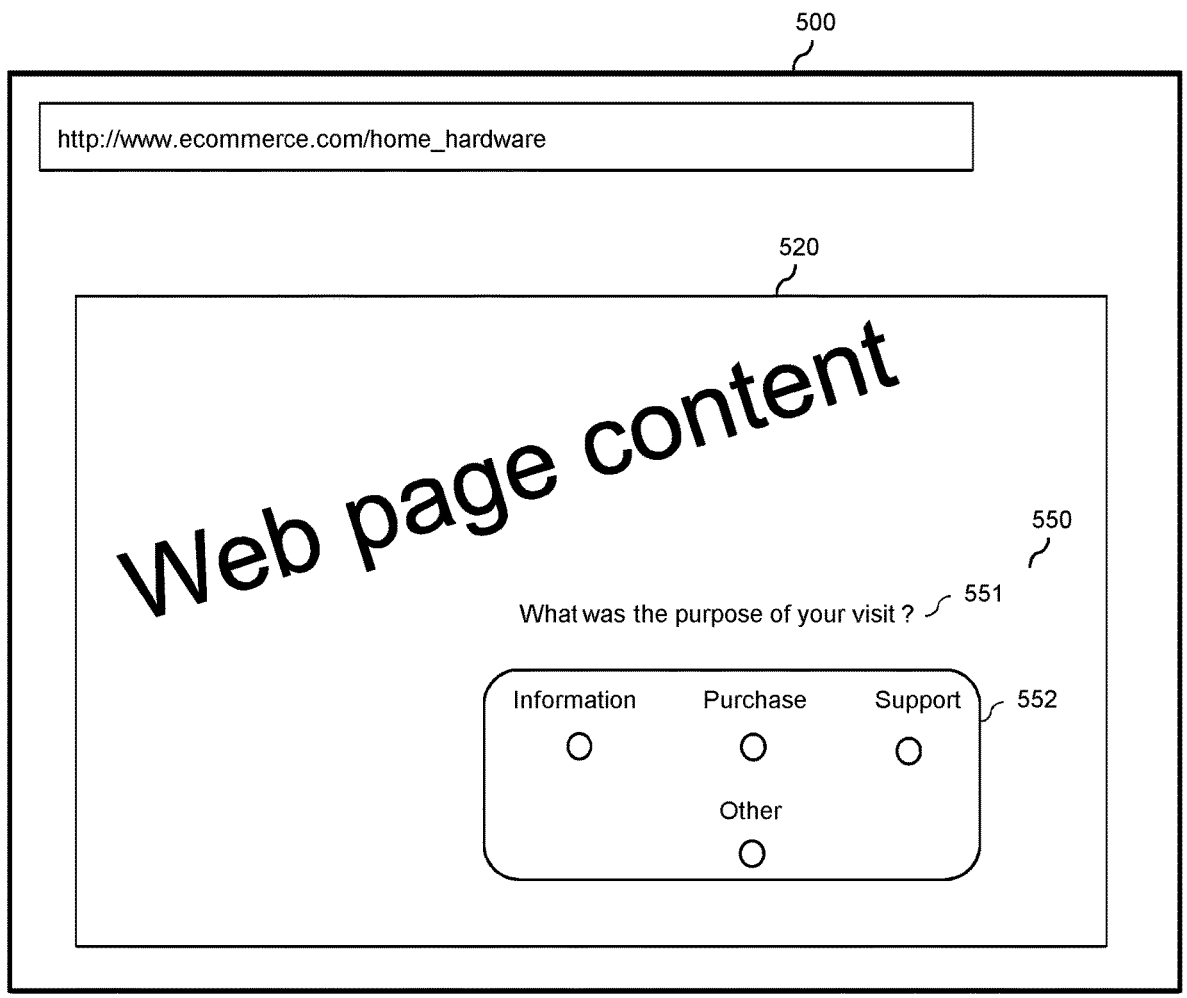
FIG. 4 illustrates an example of a web survey for collecting a user intent in relation to a visit of a website.

FIG. 4 illustrates an example of a web survey comprising a question for determining an intent of the users in relation to the visit of the specific website. A Graphical User Interface 500 of the browser executed by the processing unit 110 of the user device 100 displays web content related to the visited specific website on the display 140 of the user device 100. A GUI 550 for allowing the user of the user device 100 to provide the survey information is also displayed on the display 140. For example, the GUI 550 consists in an overlay popup window partially covering a browsing window 520 containing the displayed web content (e.g. web page home_hardware of the visited specific website).

A survey content displayed in the overlay popup window 550 comprises a closed-ended question 551 related to the intent of the user, and a selection widget 552 comprising four selectable items (information, purchase, support, other) corresponding to an intent of the user.

The interactions of the user with the GUI 550 (e.g. selection of one of the four items of the selection widget 552) generate survey participation data representative of the intent of the user for visiting the specific website. The survey participation data may comprise a value selected among pre-defined values (e.g. 1 for information, 2 for purchase, 3 for support, 4 for other) corresponding to the user intent.

In the case of the embodiment of the web survey illustrated in FIG. 4, upon reception of the training survey participation data at step 350, the collection server 200 directly extracts the intent of the user from the training survey participation data. In an alternative embodiment, the web survey does not include a question directly related to the intent of the user. Consequently, the intent of the user is inferred from the training survey participation data received at step 350, rather than being directly extracted from the training survey participation data. For this purpose, at least some of the training survey participation data are processed by the survey functionality 214 executed by the processing unit 210 of the correlation server 200, to determine the intent of the user. This processing for determining the intent of the user is out of the scope of the present disclosure, but is well known in the art of analyzing survey participation data.

In another particular aspect, the survey information provided by the user of the user device 100 when participating to the web survey is at least partially related to an experience of the user when visiting the specific website. For instance, the web survey includes one or more questions related to the experience of the user. The user experience is expressed via one of the following ratings: excellent, good, neutral, bad, and awful in response to the one or more questions. Thus, the training survey participation data collected at steps 340 and 350 are at least partially related to an experience of the user when visiting the specific website.

Step 350 comprises determining by the survey functionality 212 executed by the processing unit 210 of the correlation server 200 an experience of the users of the user devices 100 in relation to the visit of the specific website, based on the collected training survey participation data.

At step 360, the analysis by the correlation functionality 216 of the training behavioral data collected at step 330 and the training survey participation data collected at step 350 to infer correlations between the training behavioral data and the training survey participation data more specifically comprises analyzing the training behavioral data collected at step 330 and the experience of the users determined at step 350 to infer correlations between the training behavioral data and the determined experience of the users.

At step 370, the generation by the correlation functionality 216 of predictive survey participation patterns based on the correlations inferred at step 360 more specifically comprises generating predictive user experience patterns based on the correlations inferred at step 360. Based on the predictive user experience patterns, and having only behavioral data collected for the specific website for a particular user device 100, a corresponding predicted user experience in relation to the specific website can be extrapolated for the particular user device 100.

In still another particular aspect, the survey information provided by the user of the user device 100 when participating to the web survey is at least partially related to a demographic profile of the user. The demographic profile includes information about the user, such as age, sex, marital status, profession, hobbies, etc. In this case, the generation by the correlation functionality 216 (at step 370) of predictive survey participation patterns based on the correlations inferred at step 360 more specifically comprises generating predictive demographic patterns. Based on the predictive demographic patterns, and having only behavioral data collected for the specific website for a particular user device 100, a corresponding predicted demographic profile of the user visiting the specific website can be extrapolated for the particular user device 100.

In yet another particular aspect, the survey information provided by the user of the user device 100 when participating to the web survey is at least partially related to a category of interest for the user. A category of interest consists of a particular item selected among a plurality of items, the plurality items being representative of a generic product or service which can be declined in the plurality of items (or categories). For example, the web survey includes a question related to the preferred category of vehicle of the user, and the user picks a category among the following categories: car, minivan, crossover, pickup, etc. In this case, the generation by the correlation functionality 216 (at step 370) of predictive survey participation patterns based on the correlations inferred at step 360 more specifically comprises generating predictive category patterns. Based on the predictive category patterns, and having only behavioral data collected for the specific website for a particular user device 100, a corresponding predicted category of interest for the user visiting the specific website can be extrapolated for the particular user device 100.

In another particular aspect, the survey information provided by the user of the user device 100 when participating to the web survey is at least partially related to a brand perception (or a brand recall) by the user visiting the specific website. The visited specific website provides information on products or services associated to the brand, and/or offers for sales these products or services. For instance, the brand perception is expressed via one of the following ratings of the products or services offered by the brand: excellent, good, neutral, bad, and awful. The brand recall generally measures how well a brand name is connected with a product type or class of products by consumers. In this case, the generation by the correlation functionality 216 (at step 370) of predictive survey participation patterns based on the correlations inferred at step 360 more specifically comprises generating predictive brand perception patterns (or predictive brand recall patterns).

Examples of training behavioral data collected at step 320 include at least one of the following: visited Uniform Resource Locators (URLs), a keyword occurrence, time spent on one or more visited web pages of the specific website, an action firing activity on a visited web page, a scrolling activity on a visited web page, a backtracking activity on a visited web page, an exit activity on a visited web page, a hit activity on a visited web page, etc.

The URLs correspond to the web pages of the specific website visited by the user of the user device 100 during its browsing activity. The URLs may be considered as an ordered sequence of URLs or simply as an unordered set of URLs for inferring the correlations at step 360. If the sequence of the URLs is taken into consideration, then for example the sequence of URLs URL_1, URL_2 and URL_3 is considered as a different input than the sequence of URLs URL_2, URL_1 and URL_3 at step 360. If the sequence of the URLs is not taken into consideration, the set of URLs URL_1, URL_2 and URL_3 is considered the same input as the set of URLs URL_2, URL_1 and URL_3 at step 360.

The keyword occurrence is the number of times the user of the user device 100 has been exposed to a particular keyword present in one or more web pages of the specific website. The keyword occurrence can be measured with respect to the entire browsing session, with respect to a particular web page where the keyword is present, and with respect to a particular group of web pages where the keyword is present. The time spent on a web page is a duration which can be measured in seconds. The action firing activity on a web page can be measured by the number of times the user of the user device 100 has performed a specific action among a plurality of pre-defined actions (e.g. clicking on a download button, accessing a cart, etc.). The plurality of pre-defined actions depends on the design and function of the web page. The scrolling activity on a web page can be measured by the number of times the user of the user device 100 has scrolled the web page either horizontally or vertically (the action of scrolling a web page is well known in the art). The backtracking activity on a web page can be measured by the number of times the user of the user device 100 has come back to the web page from another web page of the web site during a pre-defined interval of time. The exit activity on a web page can be measured by an occurrence of the user of the user device 100 exiting the website from the web page. The hit activity on a web page can be measured by a number of occurrences of the user of the user device 100 accessing the web page.

Operational Phase (FIG. 2B)

During the operational phase, the predictive survey participation patterns generated at step 370 and stored at step 380 are used to generate predicted survey participation data at the user device 100. More specifically, as illustrated in FIG. 2B, the user device 100 is referred to as the current user device 100, in order to differentiate the learning phase illustrated in FIG. 2A (where user devices collect training behavioral data and training survey participation data) with the operational phase illustrated in FIG. 2B (where the current user device 100 collects current behavioral data for generating the predicted survey participation data).

The current user device 100 represented in FIG. 2B may have been previously involved in the training phase represented in FIG. 2A, where survey participation data were collected. However, for some reasons, the current user device 100 now no longer collects survey participation data, but instead generates predicted survey participation data. For example the user of the current user device 100 is visiting the specific website, but is not invited by the correlation server 200 to participate to the web survey. Alternatively, the user of the current user device 100 is invited, but refuses to participate to the web survey.

At step 385, the processing unit 210 of the correlation server 200 transmits the predictive survey participation patterns (stored in the memory 220 of the correlation server 200 at step 380) to the current user device 100. The predictive survey participation patterns are transmitted over the Internet 10 via the communication interface 230 of the correlation server 200.

At step 390, the predictive survey participation patterns are received via the communication interface 130 of the current device 100, and stored in the memory 120 of the current user device 100.

The moment at which the transmission (step 385) of the predictive survey participation patterns occurs may vary. For instance, step 385 occurs when the current user device needs to generate predicted survey participation data. Alternatively or complementarily, step 385 occurs each time an updated set of predictive survey participation patterns is generated by the correlation server 200 at step 370. The correlation server 200 regularly updates the generated predictive survey participation patterns, based on the most recently collected training behavioral data and training survey participation data. In this case, the learning phase is an on-going process, where the predictive survey participation patterns are continuously updated.

At step 395, the specific website hosted by the web server 20 is visited by the user of the current user device 100. The web content corresponding to the specific website is transmitted by the web server 20 to the current user device 100 over the Internet 10. Step 395 represented in FIG. 2B is similar to step 305 represented in FIG. 2A.

At step 400, the web content is displayed on the display 140 of the current user device 100 by the browser executed by the processing unit 110 of the current user device 100. Step 400 represented in FIG. 2B is similar to step 310 represented in FIG. 2A. As mentioned previously, although a single step 395 and a single step 400 are represented in FIG. 2B for simplification purposes, the sequence of steps 395 and 400 is usually repeated according to a progression of the browsing session of the specific website performed by the user of the current user device 100.

At step 410, current behavioral data are collected by the processing unit 110 of the current user device 100. The term current behavioral data is used for the behavioral data collected during the operational phase, to make a distinction with the training behavioral data collected during the training phase. The current behavioral data collected at step 410 are not transmitted to the correlation server 200, but used locally by the current user device 100. Step 410 represented in FIG. 2B is similar to step 320 represented in FIG. 2A. As mentioned previously, the current behavioral data are representative of a series of actions performed by the user of the current user device 100 while visiting the specific website.

At step 420, the processing unit 110 of the current user device 100 determines predicted survey participation data for the current user device 100 in relation to the specific website, based on the current behavioral data and the predictive survey participation patterns.

Step 420 leverages the learning phase, by using the predictive survey participation patterns to determine the predicted survey participation data, when the effective collection of survey participation data in relation to the specific website for the current user device 100 is not performed.

The same technique is used at step 420 and steps 360/370. For example, if a neural network is used at steps 360/370, then a neural network is also used at step 420. In this case, the predictive survey participation patterns comprise the parameters of the neural network determined at steps 360/370, such as the determined weights, the number of layers, etc.

The tool (e.g. a neural network) used at step 420 may be a lightweight version of the tool used at steps 360/370, since the operational phase performed at step 420 requires less processing resources than the learning phase performed at steps 360/370. For example, the tool is implemented by a lightweight application executed by the current user device 100, or by a plugin executed by a browser running on the current user device 100.

The current behavioral data collected at step 410 are of similar scope as the training behavioral data collected at step 320, in order for step 420 to be performed. If a new type of behavioral data is collected at step 410, which was not used during the training phase at step 360, then the predictive survey participation patterns generated at step 370 and used at step 420 cannot handle the new type of behavioral data.

Although the learning phase and the operational phase have been represented sequentially in FIGS. 2A and 2B for simplification purposes, they may also occur simultaneously. For instance, the learning phase may be performed solely until satisfying predictive survey participation patterns have been generated at step 370 of the method 300. For example, the generated patterns are satisfying if they allow to generate predicted survey participation data at step 420 of the method 300 with a pre-defined level of accuracy (e.g. 95% of the predicted survey participation data are accurate). Then, the operational phase is performed, but the learning phase can still be performed simultaneously to improve/update the predictive survey participation patterns generated at step 370 of the method 300.

In a previously mentioned particular aspect, the survey information provided at step 340 by the user of the user device 100 when participating to the web survey are at least partially related to an intent of the user for visiting the specific website, and the predictive survey participation patterns generated at step 370 comprise predictive user intent patterns. Thus, determining at step 420 predicted survey participation data for the current user device 100 in relation to the specific website comprises determining a predicted intent of the user of the current user device 100 in relation to the specific website based on the current behavioral data (collected at steps 410) and the predictive user intent patterns. For example, the predicted intent consists of a predicted purchase intent, indicative of a predicted intent of the user of the current user device 100 to purchase product(s) and/or service(s) available on the specific website.

In another previously mentioned particular aspect, the survey information provided at step 340 by the user of the user device 100 when participating to the web survey are at least partially related to an experience of the user when visiting the specific website; and the predictive survey participation patterns generated at step 370 comprise predictive user experience patterns. Thus, determining at step 420 predicted survey participation data for the current user device 100 in relation to the specific website comprises determining a predicted experience of the user of the current user device 100 in relation to the specific website based on the current behavioral data (collected at steps 410) and the predictive user experience patterns.

In still another previously mentioned particular aspect, the survey information provided at step 340 by the user of the user device 100 when participating to the web survey are at least partially related to a demographic profile of the user; and the predictive survey participation patterns generated at step 370 comprise predictive demographic patterns. Thus, determining at step 420 predicted survey participation data for the current user device 100 in relation to the specific website comprises determining a predicted demographic profile of the user of the current user device 100 in relation to the specific website based on the current behavioral data (collected at steps 410) and the predictive demographic patterns.

In yet another previously mentioned particular aspect, the survey information provided at step 340 by the user of the user device 100 when participating to the web survey are at least partially related to a category of interest for the user; and the predictive survey participation patterns generated at step 370 comprise predictive category patterns. Thus, determining at step 420 predicted survey participation data for the current user device 100 in relation to the specific website by the user of the current user device 100 comprises determining a predicted category of interest for the user of the current user device 100 in relation to the specific website based on the current behavioral data (collected at steps 410) and the predictive category patterns.

In another previously mentioned particular aspect, the survey information provided at step 340 by the user of the user device 100 when participating to the web survey are at least partially related to a brand perception (or a brand recall) by the user; and the predictive survey participation patterns generated at step 370 comprise predictive brand perception patterns (or predictive brand recall patterns). Thus, determining at step 420 predicted survey participation data for the current user device 100 in relation to the specific website comprises determining a predicted brand perception (or a predicted brand recall) by the user of the current user device 100 in relation to the specific website based on the current behavioral data (collected at steps 410) and the predictive brand perception patterns (or the predictive brand recall patterns).

For optimization purposes, some of the training behavioral data collected at step 320 and some of the current behavioral data collected at step 410 may be transformed in an optimized format. For instance, a checksum is calculated for the URLs collected as part of the behavioral data, and the checksum of the collected URLs is used at step 360 and 420 instead of using the collected regular URLs.

The present disclosure also relates to a non-transitory computer program product (e.g. the memory 120 of the current user device 100) comprising instructions stored thereon, for implementing the steps of the method 300 performed by the current user device 100. The instructions are executed by the processing unit 110 of the current user device 100. The instructions comprised in the non-transitory computer program product are deliverable via an electronically-readable media, such as a storage media (e.g. a USB key or a CD-ROM) or communication links (e.g. via the Internet 10 through the communication interface 130 of the current user device 100).

The execution of the instructions provides for performing step 390 of the method 300 consisting in receiving the predictive survey participation patterns from the correlation server 200, and storing the received predictive survey participation patterns in the memory 120 of the current user device 100.

The execution of the instructions provides for performing step 400 of the method 300 consisting in displaying the web content on the display 140 of the current user device 100 by the browser executed by the processing unit 110 of the current user device 100.

The execution of the instructions provides for performing step 410 of the method 300 consisting in collecting current behavioral data by the processing unit 110 of the current user device 100.

The execution of the instructions provides for performing step 420 of the method 300 consisting in determining by the processing unit 110 of the current user device 100 predicted survey participation data for the current user device 100 in relation to the specific website, based on the current behavioral data and the predictive survey participation patterns.

Although the collection of behavioral data at steps 320 and 410 has been described as being related to the visit of a specific website by the user of the user device 100, the collection of behavioral data may also be related to the execution of a particular application by the user device 100. In this case, the collected behavioral data are representative of actions performed by the user for interacting with the particular application during the execution of the particular application. The collected behavioral data may also comprise events (directly or indirectly related to the user actions) occurring during the execution of the particular application. The collection of survey participation data at step 340 is also related to the execution of the particular application by the user device 100.

Use of the Predicted Survey Participation Data for Advertising

In the context of advertising, the predicted survey participation data generated at step 420 are used for selecting an advertisement presented to the user of the current user device 100.

As is well known in the art, an advertisement server (not represented in the Figures) interacts with the current user device 100 over the Internet 10, for delivering advertisement(s) (e.g. a banner, a video, a picture, etc.) to the current user device 100, while the user of the current user device 100 is visiting a website hosted by a web server (e.g. 20). The advertisements are displayed on the display 140 of the current user device 100 along with a web content of the visited web site.

The processing unit 110 of the current user device 100 transmits (via its communication interface 130) the predicted survey participation data to the advertisement server over the Internet 10.

The advertisement server selects an advertisement for the current user device 100, based at least on the predicted survey participation data. The advertisement server may only take into consideration the predicted survey participation data for selecting the advertisement. Alternatively, the advertisement server takes into consideration the predicted survey participation data in combination with other parameter(s) for selecting the advertisement.

The advertisement server transmits the selected advertisement to the current user device 100 over the Internet 10. The selected advertisement is received by the processing unit 110 of the current device 100 via its communication interface 130. The processing unit 110 of the current user device 100 further displays the selected advertisement on the display 140.

The advertisement server is adapted for taking into consideration a particular type of predicted survey participation data, or a combination of types of predicted survey participation data. Examples of predicted survey participation data which can be handled by an advertisement server include a predicted user intent, a predicted demographic profile, a predicted category of interest, etc.

The advertisement selected by the advertisement server and displayed by the current user device 100 may consist of a targeting advertisement or a retargeting advertisement. In the case of targeted advertising, the selected targeting advertisement aims at directing the user of the user device 100 to visit a new website (different from the currently visited website). For example, by clicking on a displayed content of the targeting advertisement, the web browser of the current user device 100 is directed to the new website. The new website is selected by the advertisement server based on a predicted user intent (or a predicted demographic profile, a predicted category of interest, etc.) determined at step 420 based on the current behavioral data collected at step 410 in relation to the currently visited website.

In the case of retargeted advertising, the user of the current user device 100 has already visited a specific website, and the retargeting advertisement aims at directing the user to visit the specific website again. During the first visit of the specific website, predicted survey participation data are determined at step 420. Then, while the user of the current user device 100 is visiting another website, the retargeting advertisement is presented to the user for directing the user to visit the specific website again. For example, if the predicted survey participation data determined at step 420 consist of a predicted purchase intent, the objective of the retargeting advertisement is to increase conversion. Consequently, the retargeting advertisement consists of special offers, promotions, coupons, etc. If the predicted survey participation data determined at step 420 consist of a predicted information gathering intent, the objective of the retargeting advertisement is to perform an effective lead nurturing. Consequently, the retargeting advertisement is directed to product awareness, product specifications, product options, etc. If the predicted survey participation data determined at step 420 consist of a predicted user support intent, the objective of the retargeting advertisement is to increase customer retention. Consequently, the retargeting advertisement is directed to support topics, community knowledge, etc.

Use of the Predicted Survey Participation Data for Website Content Personalization In the context of website content personalization, the predicted survey participation data generated at step 420 are used for personalizing the content of the current website when visited by the user of the current user device 100.

After performing step 420, the processing unit 110 of the current user device 100 further processes the predicted survey participation data to generate at least one personalization parameter for the specific website. The at least one personalization parameter is specifically adapted to the user of the current user device 100 for which the predicted survey participation data have been generated at step 420.

The at least one personalization parameter and the unique identifier of the current user device 100 are transmitted by the user device 100 to the web server 20 hosting the specific website, via their respective communication interfaces over the Internet 10. The at least one personalization parameter and the unique identifier are stored in the memory of the web server 20.

In an alternative embodiment, the predicted survey participation data and the unique identifier of the current user device 100 are transmitted by the user device 100 to the web server 20 hosting the specific website. Then, the web server 20 processes the predicted survey participation data to generate at least one personalization parameter for the specific website.

When the user of the current user device 100 is visiting the specific website hosted by the web server 20, the unique identifier of the current user device 100 is transmitted by the current user device 100 to the web server 20 over the Internet 10. The processing unit of the web server 20 identifies the at least one personalization parameter (associated to the current user device 100 via its unique identifier. The processing unit of the web server 20 uses the at least one personalization parameter to personalize web content corresponding to the specific website, which is transmitted by the web server 20 to the current user device 100 over the Internet 10. The personalized web content is further displayed by the processing unit 110 of the current user device 100 on its display 140. Thus, the browsing experience of the user of the current user device 100 with respect to the specific website is adapted and personalized, based on the predicted survey participation data which have been generated by the survey server 200 at step 420.

Personalization of web content is well known in the art, and comprises for example one of the following: adapting a generic web content into a personalized web content based on one or more personalization parameters, selecting a particular web content among several candidate web contents based on one or more personalization parameters, etc. Furthermore, the personalization of the web content may comprise adapting the design (e.g. format, appearance, etc.) of a particular web page, adapting the informative content (e.g. text, image, video, etc.) provided by a particular web page, and a combination thereof.

As illustrated previously, various types of predicted survey participation data may be used independently or in combination, such as predicted user intent (e.g. predicted purchase intent), predicted user experience, predicted demographic profile, predicted category of interest, etc. For each type of predicted survey participation data, corresponding personalization parameter(s) are generated by the current user device 100.

For instance, if the predicted survey participation data consist in a predicted user intent (such as information gathering, purchase, user support), the personalization parameters determine the design and informative content of the home page and/or landing page of the specific website.

If the predicted survey participation data consist in a predicted brand perception or predicted brand recall, the personalization parameters determine the design and informative content of one or more web pages of the specific website, in order to improve the brand perception or brand recall of the user of the current user device 100 with respect to the brand corresponding to the specific website.

Examples of personalization parameters generated based on the predicted survey participation data include a numeric weight used to mathematically select a content of the website, a tag or a label used to identify particular webpage elements, a natural language description that is interpreted by a developer to manually customize a webpage, etc.

The two previous examples (advertising and website content personalization) are for illustration purposes only, and are not intended to limit the usage of the predicted survey participation data.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for generating a predicted intent of a user at a user device, the method comprising:

collecting by a processing unit of a training server training behavioral data from a plurality of user devices, the training behavioral data being representative of a series of actions performed by a user of each of the plurality of user devices while visiting a specific website;

collecting by the processing unit of the training server training survey participation data from at least some of the plurality of user devices, the training survey participation data corresponding to survey information received from the users of the at least some of the plurality of user devices when participating to a web survey related to the visit of the specific website, the survey information received from the users of the at least some of the plurality of user devices being at least partially related to an intent of the users for visiting the specific website;

determining by the processing unit of the training server the intent of the users of the at least some of the plurality of user devices in relation to the visit of the specific website based on the training survey participation data;

processing by a neural network executed by the processing unit of the training server the intent of the users of the at least some of the plurality of user devices and the corresponding training behavioral data to infer correlations between the intent of the users of the at least some of the plurality of user devices and the corresponding training behavioral data;

generating by the neural network executed by the processing unit of the training server a predictive user intent model based on the inferred correlations, the predictive user intent model comprising weights of the neural network, the predictive user intent model allowing to extrapolate a user intent using behavioral data;

transmitting the predictive user intent model comprising the weights of the neural network from the training server to a current user device and storing the predictive user intent model comprising the weights of the neural network at a memory of the current user device;

collecting by a processing unit of the current user device current behavioral data, the current behavioral data being representative of a series of actions performed by a user of the current user device while visiting the specific website; and determining by the processing unit of the current user device a predicted intent of the user of the current user device in relation to the specific website, the determination being performed by the execution of a lightweight version of the neural network using the weights comprised in the predictive user intent model transmitted by the training server and stored at the current user device to process the current behavioral data for determining the predicted intent of the user of the current user device in relation to the specific website.

2. The method of claim 1, wherein the training behavioral data and the current behavioral data comprise at least one of the following: visited URLs of the specific website, a keyword occurrence during the visit of the specific website, a time spent on a visited web page of the specific website, a scrolling activity on a visited web page of the specific website, a backtracking activity on a visited web page of the specific website, an action firing activity on a visited web page of the specific website, an exit activity on a visited web page of the specific website, and a hit activity on a visited web page of the specific website.

3. The method of claim 1, wherein the current user device is a mobile device.

4. The method of claim 3, wherein the current user device is a mobile device consisting of a smartphone or a tablet.

5. The method of claim 1, wherein the predicted intent of the user of the current user device in relation to the specific website consists of information gathering, price learning, purchase, account management or user support.

* * * * *